United States Patent
De et al.

(10) Patent No.: US 6,608,859 B2
(45) Date of Patent: *Aug. 19, 2003

(54) FAST JOINT DETECTION BASE STATION

(75) Inventors: Parthapratim De, Plainview, NY (US); Jung-Lin Pan, Selden, NY (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/081,304

(22) Filed: Feb. 20, 2002

(65) Prior Publication Data

US 2003/0026325 A1 Feb. 6, 2003

Related U.S. Application Data

(63) Continuation of application No. 10/037,710, filed on Dec. 31, 2001.
(60) Provisional application No. 60/287,431, filed on Apr. 30, 2001.

(51) Int. Cl.[7] .............................. H04B 1/69; H04B 7/216
(52) U.S. Cl. ......................... 375/147; 375/150; 370/342
(58) Field of Search ................................. 375/147, 150; 370/335, 342, 441, 320

(56) References Cited

U.S. PATENT DOCUMENTS

| | | | |
|---|---|---|---|
| 6,144,711 A | 11/2000 | Raleigh et al. | |
| 6,208,295 B1 | 3/2001 | Dogan et al. | |
| 6,252,540 B1 | 6/2001 | Hale et al. | |
| 6,370,129 B1 | 4/2002 | Huang | |

OTHER PUBLICATIONS

Anja Klein, Ghassan Kawas Kaleh and Paul Walter Baier, "Zero Forcing and Minimum Mean–Square–Error Equalization for Multiuser Detection in Code–Division Multiple–Access Channels," IEEE Transactions on Vehicular Technology, vol. 45, No. 2, May 1996.

Anja Klein, "Data Detection Algorithms Specially Designed for the Downlink of CDMA Mobile Radio Systems," IEEE 47th Vehicular Technology Conference, Phoenix, Arizona, USA, May 4–7, 1997.

H.R. Karimi and N.W. Anderson, "A Novel and Efficient Solution to Block–Based Joint–Detection Using Approximate Cholesky Factorization," Motorola GSM Products Division, Swindon, UK, 1998.

PA Consulting Group/Racal Instruments Ltd., "Low Cost MMSE–BLE–SD Algorithm for UTRA TDD Mode Downlink," ETSI STC SMG2 Layer 1 Expert Group, Helsinki, Finland Sep. 8–11, 1998.

Anja Klein and Paul W. Baier, "Linear Unbiased Data Estimation in Mobile Radio Systems Applying CDMA," IEEE Journal on Selected Areas in Communications, vol. 11, No. 7, Sep. 1993.

*Primary Examiner*—Tesfaldet Bocure
(74) *Attorney, Agent, or Firm*—Volpe and Koenig, P.C.

(57) ABSTRACT

A code division multiple access base station receives K data signals over a shared spectrum. The base station receives and samples a combined signal having the K transmitted data signals. A combined channel response matrix is produced. A block column of a cross correlation matrix is determined using the combined channel response matrix. Each block entry of the block column is a K by K matrix. Each block entry of the block column is a K by K matrix. A fourier transform of a complex conjugate transpose of the combined channel response matrix multiplied to the combined signal samples is taken. An inverse of a fourier transform of each block entry is multiplied to a result of the fourier transform to produce a fourier transform of the data vector. An inverse fourier transform of the data vector fourier transform is taken to produce data of the K signals.

12 Claims, 7 Drawing Sheets

FAST JOINT DETECTION BASE STATION

This application is a continuation of U.S. patent application Ser. No. 10/037,710, filed Dec. 31, 2001, which claims priority to U.S. Provisional Patent Application No. 60/287,431, filed on Apr. 30, 2001, which applications are incorporated herein by reference.

BACKGROUND

The invention generally relates to wireless communication systems. In particular, the invention relates to data detection in a wireless communication system.

FIG. 1 is an illustration of a wireless communication system 10. The communication system 10 has base stations $12_1$ to $12_5$ (12) which communicate with base stations $14_1$ to $14_3$ (14). Each base station 12 has an associated operational area, where it communicates with UEs 14 in its operational area.

In some communication systems, such as frequency division duplex using code division multiple access (FDD/CDMA) and time division duplex using code division multiple access (TDD/CDMA), multiple communications are sent over the same frequency spectrum. These communications are differentiated by their channelization codes. To more efficiently use the frequency spectrum, TDD/CDMA communication systems use repeating frames divided into timeslots for communication. A communication sent in such a system will have one or multiple associated codes and timeslots assigned to it.

Since multiple communications may be sent in the same frequency spectrum and at the same time, a receiver in such a system must distinguish between the multiple communications. One approach to detecting such signals is multiuser detection (MUD). In MUD, signals associated with all the UEs 14, users, are detected simultaneously. Another approach to detecting a multi-code transmission from a single transmitter is single user detection (SUD). In SUD, to recover data from the multi-code transmission at the receiver, the received signal is passed through an equalization stage and despread using one or multiple codes. Approaches for implementing MUD and the equalization stage of SUD include using a Cholesky or an approximate Cholesky decomposition. These approaches have a high complexity. The high complexity leads to increased power consumption, which at the UE 14 results in reduced battery life. Accordingly, it is desirable to have alternate approaches to detecting received data.

SUMMARY

A code division multiple access base station receives K data signals over a shared spectrum. The base station receives and samples a combined signal having the K transmitted data signals. A combined channel response matrix is produced. A block column of a cross correlation matrix is determined using the combined channel response matrix. Each block entry of the block column is a K by K matrix. Each block entry of the block column is a K by K matrix. A fourier transform of a complex conjugate transpose of the combined channel response matrix multiplied to the combined signal samples is taken. An inverse of a fourier transform of each block entry is multiplied to a result of the fourier transform to produce a fourier transform of the data vector. An inverse fourier transform of the data vector fourier transform is taken to produce data of the K signals.

BRIEF DESCRIPTION OF THE DRAWING(S)

DETAILED DESCRIPTION OF THE PREFERRED EMBODIMENT(S)

Figure 2:
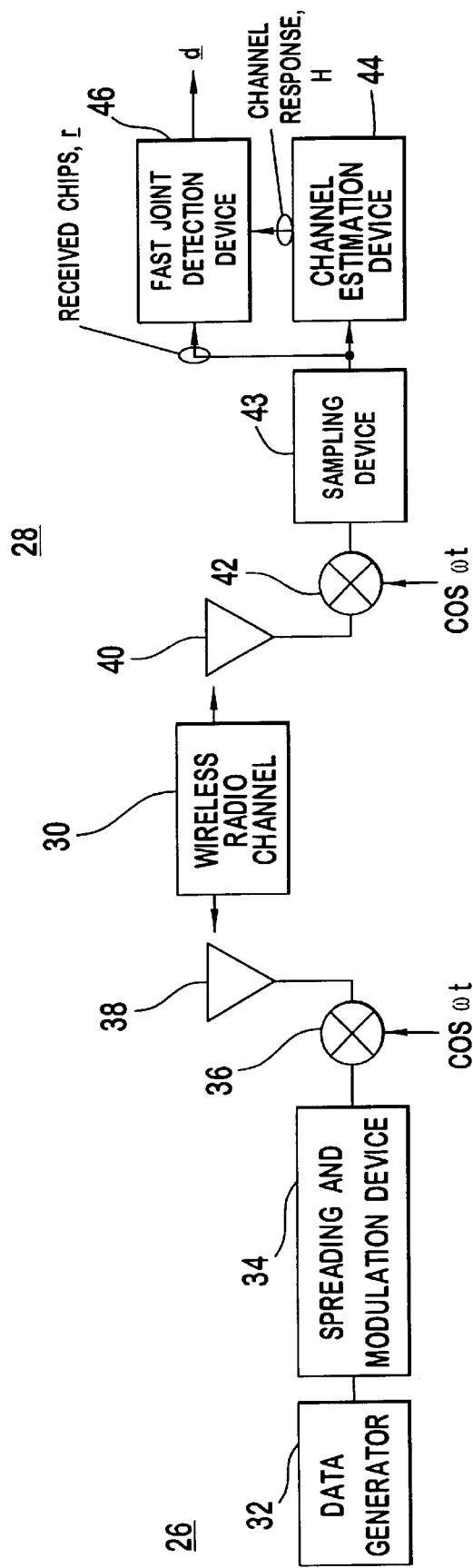
FIG. 2 is a simplified transmitter and a fast joint detection receiver.

FIG. 2 illustrates a simplified transmitter 26 and receiver 28 using fast joint detection in a TDD/CDMA communication system, although fast joint detection is applicable to other systems, such as FDD/CDMA. In a typical system, a transmitter 26 is in each UE 14 and multiple transmitting circuits 26 sending multiple communications are in each base station 12. The joint detection receiver 28 may be at a base station 12, UEs 14 or both.

The transmitter 26 sends data over a wireless radio channel 30. A data generator 32 in the transmitter 26 generates data to be communicated to the receiver 28. A modulation/spreading/training sequence insertion device 34 spreads the data with the appropriate code(s) and makes the spread reference data time-multiplexed with a midamble training sequence in the appropriate assigned time slot, producing a communication burst or bursts.

Figure 1:
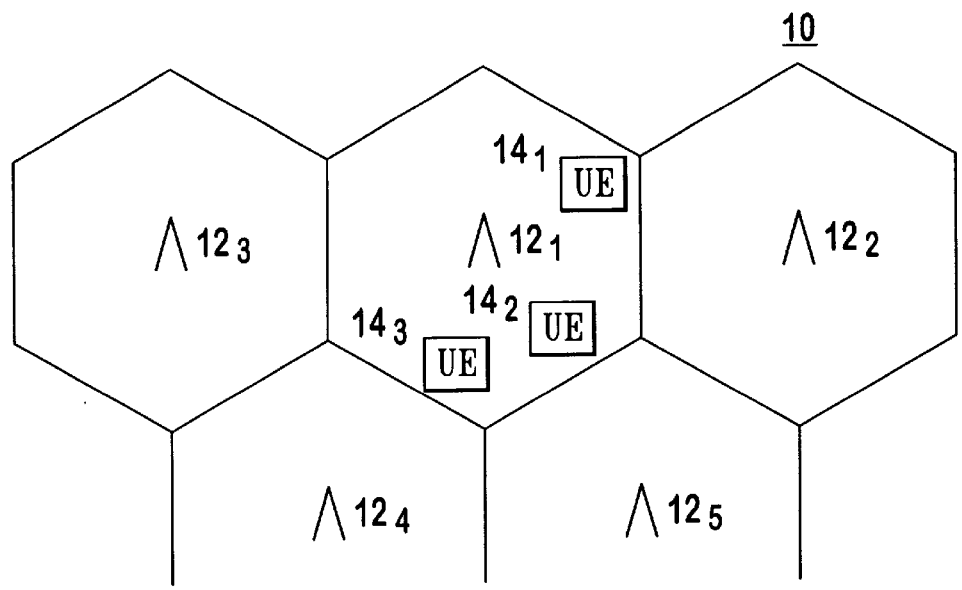
FIG. 1 is a wireless communication system.
Figure 3:
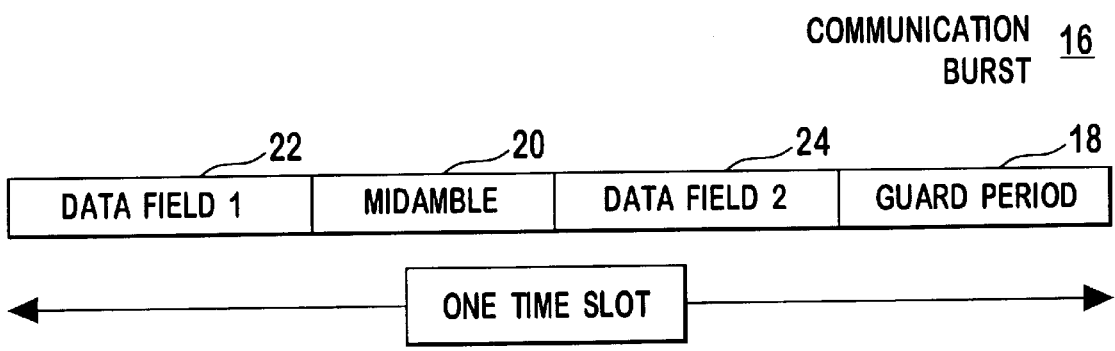
FIG. 3 is an illustration of a communication burst.

A typical communication burst 16 has a midamble 20, a guard period 18 and two data fields 22, 24, as shown in FIG. 3. The midamble 20 separates the two data fields 22, 24 and the guard period 18 separates the communication bursts to allow for the difference in arrival times of bursts transmitted from different transmitters 26. The two data fields 22, 24 contain the communication burst's data.

The communication burst(s) are modulated by a modulator 36 to radio frequency (RF). An antenna 38 radiates the RF signal through the wireless radio channel 30 to an antenna 40 of the receiver 28. The type of modulation used for the transmitted communication can be any of those known to those skilled in the art, such as quadrature phase shift keying (QPSK) or M-ary quadrature amplitude modulation (QAM).

The antenna 40 of the receiver 28 receives various radio frequency signals. The received signals are demodulated by a demodulator 42 to produce a baseband signal. The baseband signal is sampled by a sampling device 43, such as one or multiple analog to digital converters, at the chip rate or a multiple of the chip rate of the transmitted bursts. The samples are processed, such as by a channel estimation device 44 and a fast joint detection device 46, in the time slot and with the appropriate codes assigned to the received bursts. The channel estimation device 44 uses the midamble training sequence component in the baseband samples to provide channel information, such as channel impulse responses. The channel impulse responses for all the transmitted signals can be viewed as a matrix, H. The channel information is used by the fast joint detection device 46 to estimate the transmitted data of the received communication bursts as soft symbols.

The fast joint detection device 46 uses the channel information provided by the channel estimation device 44 and the known spreading codes used by the transmitter 26 to estimate the data of the desired received communication burst(s).

Although fast joint detection is explained using the third generation partnership project (3GPP) universal terrestrial radio access (UTRA) TDD system as the underlying communication system, it is applicable to other systems. That system is a direct sequence wideband CDMA (W-CDMA) system, where the uplink and downlink transmissions are confined to mutually exclusive timeslots.

The receiver 28 receives a total of K bursts that arrive simultaneously. The K bursts are superimposed on top of each other in one observation interval. For the 3GPP UTRA TDD system, each data field of a time slot corresponds to one observation interval. A code used for a $k^{th}$ burst is represented as $C^{(k)}$. The K bursts may originate from K different transmitters or for multi-code transmissions, less than K different transmitters.

Each data field of a communication burst has a predetermined number of transmitted symbols, $N_S$. Each symbol is transmitted using a predetermined number of chips, which is the spreading factor, SF. Accordingly, each data field has $N_S \times SF$ chips. After passing through the wireless radio channel, each symbol has an impulse response, such as of length W chips. A typical value for W is 57. As a result, each received field has a length of $SF \times N_S + W - 1$ chips or $N_C$ chips.

Each $k^{th}$ field of the K data fields in one observation interval can be modeled at the receiver by Equation 1.

$$\underline{r}^{(k)} = A^{(k)} \underline{d}^{(k)}, k=1 \ldots K \qquad \text{Equation 1}$$

$\underline{r}^{(k)}$ is the received contribution of the $k^{th}$ field. $A^{(k)}$ is the combined channel response for the $k^{th}$ field. $A^{(k)}$ is a $N_C \times N_S$ matrix. Each $j^{th}$ column in $A^{(k)}$ is a zero-padded version of the symbol response $S^{(k)}$ of the $j^{th}$ element of $\underline{d}^{(k)}$. The symbol response $S^{(k)}$ is the convolution of the $k^{th}$ field's estimate response, $\underline{h}^{(k)}$, and spreading code $C^{(k)}$ for the field. $\underline{d}^{(k)}$ is the unknown data symbols in the $k^{th}$ data field. $\underline{h}^{(k)}$ is of length W chips and can be represented by Equation 2.

$$\underline{h}^{(k)} = \gamma^{(k)} \cdot \tilde{\underline{h}}^{(k)} \qquad \text{Equation 2}$$

$\gamma^{(k)}$ reflects the transmitter gain and path loss. $\tilde{\underline{h}}^{(k)}$ is the channel impulse response.

For uplink communications, each $\tilde{\underline{h}}^{(k)}$ as well as each $\gamma^{(k)}$ are distinct. For the downlink, all of the fields have the same $\tilde{\underline{h}}^{(k)}$ but each $\gamma^{(k)}$ is different. If transmit diversity is used in the downlink, each $\gamma^{(k)}$ and $\tilde{\underline{h}}^{(k)}$ are distinct.

The overall received vector $\underline{r}$ from all K fields sent over the wireless channel is per Equation 3.

$$\underline{r} = \sum_{k=1}^{K} \underline{r}^{(k)} + \underline{n} \qquad \text{Equation 3}$$

$\underline{n}$ is a zero-mean noise vector.

By combining the $A^{(k)}$ for all data fields into a total channel response matrix A and all the unknown data for each burst $\underline{d}^{(k)}$ into a total data vector $\underline{d}$, Equation 1 becomes Equation 4.

$$\underline{r} = A\underline{d} + \underline{n} \qquad \text{Equation 4}$$

Determining $\underline{d}$ using a MMSE solution is per Equation 5.

$$\underline{d} = R^{-1}(A^H \underline{r}) \qquad \text{Equation 5}$$

$(\cdot)^H$ represents the hermetian function (complex conjugate transpose). R for a MMSE solution is per Equation 6.

$$R = A^H A + \sigma^2 I \qquad \text{Equation 6}$$

$\sigma^2$ is the noise variance, typically obtained from the channel estimation device 44, and I is the identity matrix.

Using fast fourier transforms (FFTs), although other fourier transforms may be used, this equation is solved, preferably, per Equation 7.

$$[F(\underline{d})]_k = [\Lambda^{(k)}]^{-1} [F(A^H \underline{r})]_k \qquad \text{Equation 7}$$

$F(\cdot)$ indicates the FFT function. The $[\cdot]_k$ indicate that the equation is solved at each frequency point k. $\Lambda^{(k)}$ are block entries of size K by K of a block diagonal matrix $\Lambda$. The derivation of $\Lambda$ is described subsequently. Instead of directly solving Equation 7, Equation 7 can be solved using forward and backward substitution.

Figure 4:
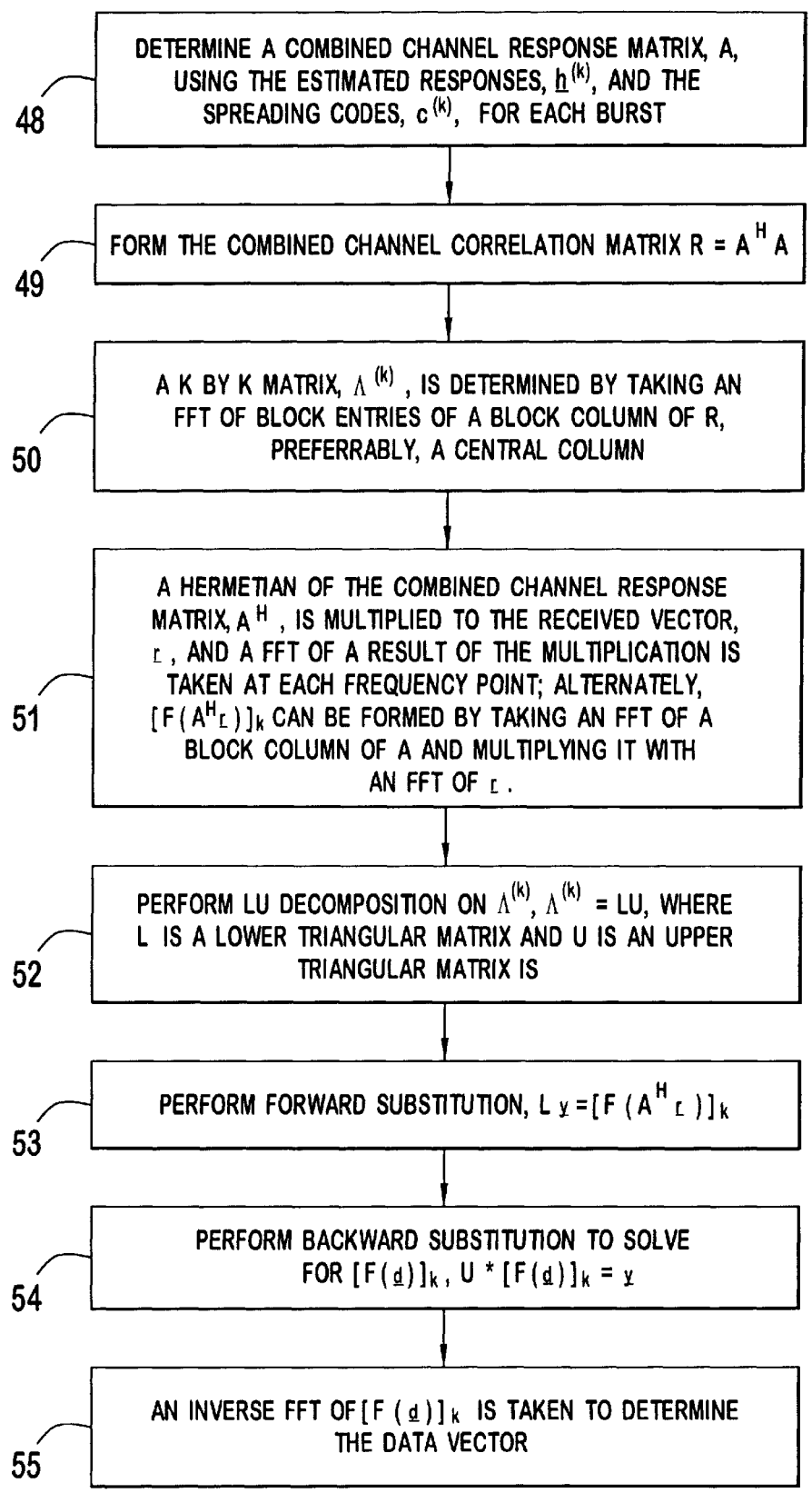
FIG. 4 is a flow chart of a preferred embodiment for fast joint detection.

FIG. 4 is a flow chart for a preferred method of determining the data vector $\underline{d}$ using fast joint detection. The combined channel response matrix A is determined using the estimated responses $\underline{h}^{(k)}$ and the spreading code $c^{(k)}$ for each burst $c^{(k)}$, 48. Form the combined channel correlation matrix, $R = A^H A$, 49. At each frequency point, a K by K matrix $\Lambda^{(K)}$ is determined by taking the fourier transform of block entries of a block column of R (block FFT), 50. Preferably, a central column is used, at least w columns from the left or right of the R matrix.

$F[A^H \underline{r}]_k$ is determined using a FFT of a matrix multiplication, 51. The inverse of each $\Lambda^{(k)}$, $[\Lambda^{(k)}]^{-1}$, is determined. To determine $[F(\underline{d})]_k$, $[\Lambda^{(k)}]^{-1}$ and $[F(A^H \underline{r})]_k$ are multiplied at each frequency point. Alternately, $[F(\underline{d})]_k$ is determined using LU decomposition. $\Lambda^{(k)}$ is decomposed into a lower triangular matrix, L, and an upper triangular matrix, U, 52. Using forward, $L\underline{y} = [F(A^H \underline{r})]$, 53, and backward substitution, $U[F(\underline{d})]_K = \underline{y}$, 54, $[F(\underline{d})]_K$ is determined. $\underline{d}$ is determined by an inverse FFT of $F(\underline{d})$, 55.

The derivation of Equation 7 is as follows. A minimum mean square error solution of Equation 4 is determined per Equation 8. Although Equation 7 is a MMSE based solution, fast joint detection can be implemented using other approaches, such as a zero forcing approach.

$$R\underline{d} = (A^H A + \sigma^2 I)\underline{d} = A^H \underline{r} \qquad \text{Equation 8}$$

If a zero forcing solution is used, the $\sigma^2 I$ term drops out of Equation 8, such as $R\underline{d} = (A^H A)\underline{d} = A^H \underline{r}$. The following is a derivation for the MMSE solution, although an analogous derivation can be used for a zero forcing solution. For illustrative purposes, a simplified example of R with $N_s=10$ and $W=2$ is per Equation 9. This example is readily extendable to any $N_s$ and W.

$$R = \begin{bmatrix} R_0 & R_1^H & R_2^H & 0 & 0 & 0 & 0 & 0 & 0 & 0 \\ R_1 & R_0 & R_1^H & R_2^H & 0 & 0 & 0 & 0 & 0 & 0 \\ \cdots & \cdots & \cdots & \cdots & \cdots & \cdots & \cdots & \cdots & \cdots & \cdots \\ R_2 & R_1 & R_0 & R_1^H & R_2^H & 0 & 0 & 0 & 0 & 0 \\ 0 & R_2 & R_1 & R_0 & R_1^H & R_2^H & 0 & 0 & 0 & 0 \\ 0 & 0 & R_2 & R_1 & R_0 & R_1^H & R_2^H & 0 & 0 & 0 \\ 0 & 0 & 0 & R_2 & R_1 & R_0 & R_1^H & R_2^H & 0 & 0 \\ 0 & 0 & 0 & 0 & R_2 & R_1 & R_0 & R_1^H & R_2^H & 0 \\ 0 & 0 & 0 & 0 & 0 & R_2 & R_1 & R_0 & R_1^H & R_2^H \\ \cdots & \cdots & \cdots & \cdots & \cdots & \cdots & \cdots & \cdots & \cdots & \cdots \\ 0 & 0 & 0 & 0 & 0 & 0 & R_2 & R_1 & R_0 & R_1^H \\ 0 & 0 & 0 & 0 & 0 & 0 & 0 & R_2 & R_1 & R_0 \end{bmatrix} \quad \text{Equation 9}$$

The matrix R is of size $(KN_s)$ by $(KN_s)$ in general. Each entry, $R_i$, in the R matrix is a K by K block. The sub-matrix, within the dotted lines of R, is block-circulant, i.e. a block-wise extension of a circulant matrix. The portion of R, which is not block-circulant, depends on the maximum multipath delay spread, W.

A block-circulant extension of the matrix R, $R_C$, in Equation 9 is per Equation 10.

$$R_c = \begin{bmatrix} R_0 & R_1^H & R_2^H & 0 & 0 & 0 & 0 & 0 & R_2 & R_1 \\ R_1 & R_0 & R_1^H & R_2^H & 0 & 0 & 0 & 0 & 0 & R_2 \\ \cdots & \cdots & \cdots & \cdots & \cdots & \cdots & \cdots & \cdots & \cdots & \cdots \\ R_2 & R_1 & R_0 & R_1^H & R_2^H & 0 & 0 & 0 & 0 & 0 \\ 0 & R_2 & R_1 & R_0 & R_1^H & R_2^H & 0 & 0 & 0 & 0 \\ 0 & 0 & R_2 & R_1 & R_0 & R_1^H & R_2^H & 0 & 0 & 0 \\ 0 & 0 & 0 & R_2 & R_1 & R_0 & R_1^H & R_2^H & 0 & 0 \\ 0 & 0 & 0 & 0 & R_2 & R_1 & R_0 & R_1^H & R_2^H & 0 \\ 0 & 0 & 0 & 0 & 0 & R_2 & R_1 & R_0 & R_1^H & R_2^H \\ \cdots & \cdots & \cdots & \cdots & \cdots & \cdots & \cdots & \cdots & \cdots & \cdots \\ R_2^H & 0 & 0 & 0 & 0 & 0 & R_2 & R_1 & R_0 & R_1^H \\ R_1^H & R_2^H & 0 & 0 & 0 & 0 & 0 & R_2 & R_1 & R_0 \end{bmatrix} \quad \text{Equation 10}$$

A "Discrete Fourier Transform (DFT)-like" matrix D is determined such that $R_c = DAD^H$. One such matrix D is per Equation 11.

$$D = \begin{bmatrix} I & e^{\frac{j2\pi}{N_s}}I_K & e^{\frac{j4\pi}{N_s}}I_K & \cdots & e^{\frac{j18\pi}{N_s}}I_K \\ I & e^{\frac{j4\pi}{N_s}}I_K & e^{\frac{j8\pi}{N_s}}I_K & \cdots & e^{\frac{j36\pi}{N_s}}I_K \\ \vdots & \vdots & \vdots & & \vdots \\ I & e^{\frac{j18\pi}{N_s}}I_K & e^{\frac{j36\pi}{N_s}}I_K & \cdots & e^{\frac{j162\pi}{N_s}}I_K \\ I & e^{\frac{j20\pi}{N_s}}I_K & e^{\frac{j40\pi}{N_s}}I_K & \cdots & e^{\frac{j180\pi}{N_s}}I_K \end{bmatrix} \quad \text{Equation 11}$$

$I_K$ is a K by K identity matrix.

The product $D^H D$ is per Equation 9.

$$D^H D = N_s I_{KN_s} \quad \text{Equation 12}$$

$I_{KN_s}$ is a $KN_s$ by $KN_s$ identity matrix. The block circulant matrix $R_c$ is multiplied by the D matrix, such as per Equation 13.

$$R_c D = \begin{bmatrix} (R_0 + R_1^H + R_2^H + R_1 + R_2) & \vdots & \left(R_0 e^{\frac{j2\pi}{N_s}} + R_1^H e^{\frac{j4\pi}{N_s}} + R_2^H e^{\frac{j6\pi}{N_s}} + R_2 e^{\frac{j18\pi}{N_s}} + R_1 e^{\frac{j20\pi}{N_s}}\right) & \vdots \cdots & \left(R_0 e^{\frac{j18\pi}{N_s}} + R_1^H e^{\frac{j36\pi}{N_s}} + R_2^H e^{\frac{j54\pi}{N_s}} + R_2 e^{\frac{j162\pi}{N_s}} + R_1 e^{\frac{j180\pi}{N_s}}\right) \\ (R_0 + R_1^H + R_2^H + R_1 + R_2) & \vdots & \left(R_1 e^{\frac{j2\pi}{N_s}} + R_0 e^{\frac{j4\pi}{N_s}} + R_1^H e^{\frac{j6\pi}{N_s}} + R_2^H e^{\frac{j8\pi}{N_s}} + R_2 e^{\frac{j20\pi}{N_s}}\right) & \vdots \cdots & \left(R_1 e^{\frac{j18\pi}{N_s}} + R_0 e^{\frac{j36\pi}{N_s}} + R_1^H e^{\frac{j54\pi}{N_s}} + R_2^H e^{\frac{j72\pi}{N_s}} + R_2 e^{\frac{j180\pi}{N_s}}\right) \\ \vdots & \vdots & \vdots & \vdots \\ (R_0 + R_1^H + R_2^H + R_1 + R_2) & \vdots & \left(R_2 e^{\frac{j12\pi}{N_s}} + R_1 e^{\frac{j14\pi}{N_s}} + R_0 e^{\frac{j16\pi}{N_s}} + R_1^H e^{\frac{j18\pi}{N_s}} + R_2^H e^{\frac{j20\pi}{N_s}}\right) & \vdots \cdots & \left(R_0 e^{\frac{j108\pi}{N_s}} + R_1^H e^{\frac{j126\pi}{N_s}} + R_0 e^{\frac{j144\pi}{N_s}} + R_1^H e^{\frac{j162\pi}{N_s}} + R_2^H e^{\frac{j180\pi}{N_s}}\right) \\ \vdots & \vdots & & \vdots \end{bmatrix} \quad \text{Equation 13}$$

Each entry of $R_c D$ is a K by K block. A block-diagonal matrix $\Lambda$ is per Equation 14.

$$\Lambda \overset{\Delta}{=} \begin{bmatrix} \Lambda^{(1)} & & & & \\ & \Lambda^{(2)} & & & \\ & & \Lambda^{(3)} & & \\ & & & \ddots & \\ & & & & \Lambda^{(N_s)} \end{bmatrix} \quad \text{Equation 14}$$

$\Lambda$ is of size $(KN_s)$ by $(KN_s)$. Each entry $\Lambda^i$ of $\Lambda$ is per Equation 15.

$$\Lambda^{(i)} = \begin{bmatrix} \lambda_{11}^{(i)} & \cdots & \lambda_{1K}^{(i)} \\ \vdots & & \vdots \\ \lambda_{KI}^{(i)} & \cdots & \lambda_{KK}^{(i)} \end{bmatrix}. \quad \text{Equation 15}$$

$\Lambda^{(i)}$ is a K by K block and has $K^2$ non-zero entries.

The D matrix is multiplied to the $\Lambda$ matrix, such as per Equation 16.

$$D\Lambda = \begin{bmatrix} \Lambda^{(1)} & \Lambda^{(2)}e^{\frac{j2\pi}{N_s}} & \Lambda^{(3)}e^{\frac{j4\pi}{N_s}} & \cdots & \Lambda^{(N_s-1)}e^{\frac{j16\pi}{N_s}} & \Lambda^{(N_s)}e^{\frac{j18\pi}{N_s}} \\ \Lambda^{(1)} & \Lambda^{(2)}e^{\frac{j4\pi}{N_s}} & \Lambda^{(3)}e^{\frac{j8\pi}{N_s}} & \cdots & \Lambda^{(N_s-1)}e^{\frac{j32\pi}{N_s}} & \Lambda^{(N_s)}e^{\frac{j36\pi}{N_s}} \\ \vdots & \vdots & \vdots & & \vdots & \vdots \\ \Lambda^{(1)} & \Lambda^{(2)}e^{\frac{j14\pi}{N_s}} & \Lambda^{(3)}e^{\frac{j28\pi}{N_s}} & \cdots & \Lambda^{(N_s-1)}e^{\frac{j112\pi}{N_s}} & \Lambda^{(N_s)}e^{\frac{j126\pi}{N_s}} \\ \Lambda^{(1)} & \Lambda^{(2)}e^{\frac{j16\pi}{N_s}} & \Lambda^{(3)}e^{\frac{j32\pi}{N_s}} & \cdots & \Lambda^{(N_s-1)}e^{\frac{j128\pi}{N_s}} & \Lambda^{(N_s)}e^{\frac{j144\pi}{N_s}} \\ \vdots & \vdots & \vdots & & \vdots & \vdots \end{bmatrix} \quad \text{Equation 16}$$

Each entry of $D\Lambda$ as shown in Equation 16 is a K by K block.

The system of equations produced by equating each row of $R_c D$ with each row of $D\Lambda$ is consistent. Accordingly, the same set of equations result by equating any row of $R_c D$ with the same row of $D\Lambda$. To illustrate for Equation 13, the first row-block of $R_c D$ is per Equation 17.

$$\left[ (R_0 + R_1^H + R_2^H + R_1 + R_2), \right. \quad \text{Equation 17}$$
$$\left( R_0 e^{\frac{j2\pi}{N_s}} + R_1^H e^{\frac{j4\pi}{N_s}} + R_2^H e^{\frac{j6\pi}{N_s}} + R_2 e^{\frac{j18\pi}{N_s}} + R_1 e^{\frac{j20\pi}{N_s}} \right), \cdots ,$$
$$\left( R_0 e^{\frac{j16\pi}{N_s}} + R_1^H e^{\frac{j32\pi}{N_s}} + R_2^H e^{\frac{j48\pi}{N_s}} + R_2 e^{\frac{j144\pi}{N_s}} + R_1 e^{\frac{j160\pi}{N_s}} \right),$$
$$\left. \left( R_0 e^{\frac{j18\pi}{N_s}} + R_1^H e^{\frac{j36\pi}{N_s}} + R_2^H e^{\frac{j54\pi}{N_s}} + R_2 e^{\frac{j162\pi}{N_s}} + R_1 e^{\frac{j180\pi}{N_s}} \right) \right]$$

The first row-block of $D\Lambda$ is per Equation 18.

$$\left[ \Lambda^{(1)}, \Lambda^{(2)} e^{\frac{j2\pi}{N_s}}, \Lambda^{(3)} e^{\frac{j4\pi}{N_s}} \cdots, \Lambda^{(N_s-1)} e^{\frac{j16\pi}{N_s}}, \Lambda^{(N_s)} e^{\frac{j18\pi}{N_s}} \right] \quad \text{Equation 18}$$

Equating the entries of these two rows, Equations 19 and 20 result.

$$\Lambda^{(1)} = (R_0 + R_1^H + R_2^H + R_1 + R_2) \quad \text{Equation 19}$$

$$\Lambda^{(2)} e^{\frac{j2\pi}{N_s}} = \quad \text{Equation 20}$$

$$\left( R_0 e^{\frac{j2\pi}{N_s}} + R_1^H e^{\frac{j4\pi}{N_s}} + R_2^H e^{\frac{j6\pi}{N_s}} + R_2 e^{\frac{j18\pi}{N_s}} + R_1 e^{\frac{j20\pi}{N_s}} \right) =$$

$$e^{\frac{j2\pi}{N_s}} \left( R_0 + R_1^H e^{\frac{j2\pi}{N_s}} + R_2^H e^{\frac{j4\pi}{N_s}} + R_2 e^{\frac{-j4\pi}{N_s}} + R_1 e^{\frac{-j2\pi}{N_s}} \right)$$

As a result, $\Lambda^{(2)}$ is per Equation 21.

$$\Lambda^{(2)} = \left( R_0 + R_1^H e^{\frac{j2\pi}{N_s}} + R_2^H e^{\frac{j4\pi}{N_s}} + R_2 e^{\frac{-j4\pi}{N_s}} + R_1 e^{\frac{-j2\pi}{N_s}} \right) \quad \text{Equation 21}$$

Similarly, $\Lambda^{(N_s-1)}$ is per Equation 22.

$$\Lambda^{(N_s-1)} = \left( R_0 + R_1^H e^{\frac{j2(N_s-2)\pi}{N_s}} + \right. \quad \text{Equation 22}$$
$$\left. R_2^H e^{\frac{j4(N_s-2)\pi}{N_s}} + R_2 e^{\frac{-j4(N_s-2)\pi}{N_s}} + R_1 e^{\frac{-j2(N_s-2)\pi}{N_s}} \right)$$

$\Lambda^{(N_s)}$ is per Equation 23.

$$\Lambda^{(N_s)} = \left( R_0 + R_1^H e^{\frac{j2(N_s-1)\pi}{N_s}} + \right. \quad \text{Equation 23}$$
$$\left. R_2^H e^{\frac{j4(N_s-1)\pi}{N_s}} + R_2 e^{\frac{-j4(N_s-1)\pi}{N_s}} + R_1 e^{\frac{-j2(N_s-1)\pi}{N_s}} \right)$$

Although Equations 17–23 illustrate using the first row of $R_C D$ and $D\Lambda$, any row can be used to determine the $\Lambda^{(i)}$s.

To illustrate using a center row, $(N_s/2)^{th}$ row (row 5 of Equation 7), $\Lambda^{(1)}$ is per Equation 19.

$$\Lambda^{(1)} = (R_0 + R_1^H + R_2^H + R_1 + R_2) \quad \text{Equation 19}$$

Equations 19–23 compute the FFT of K by K blocks. Since these blocks are multiplied by scalar exponentials, this process is referred to as a "block FFT." Typical approaches for calculating FFTs, such as the Matlab function "fft" compute the FFTs of a one-sided sequence. Since each $\Lambda^{(i)}$ is a two sided sequence, the computation of $\Lambda^{(i)}$ can be implemented by a fft $\{0,0, \ldots, R_2, R_1, R_0, R_1^H, R_2^H, \ldots, 0,0\}$ and multiplying it exponential function as per Equation 27 for a center row.

$$e^{j2\pi(k-1)v}, \text{ where } v = \frac{\left[ \text{ceil}\left(\frac{N_s}{2}\right) - 1 \right]}{N_s} \quad \text{Equation 27}$$

As shown in Equations 17–27, calculating all the $\Lambda^{(i)}$ can be performed using a single column of R. Accordingly, $R_C$ is not required to be determined. Any column of R can be used to derive the $\Lambda^{(i)}$s directly. Preferably, a row at least W rows from either edge of R is used, since these rows have a full set of $R_j$s.

Using the $\Lambda^{(i)}$s and the D matrix, the block-circulant matrix $R_c$ can be re-written as Equations 28 and 29.

$$R_c D = D\Lambda \quad \text{Equation 28}$$

$$R_c = (1/N_s)[D\Lambda D^H] \quad \text{Equation 29}$$

D and $\Lambda$ are each of size $(KN_s)$ by $(KN_s)$.

Since $D^H D = N_s I_{KN_s}, D^{-1} = (1/N_s)D^H$, Equation 30 results.

$$R_c^{-1} = N_s[(D^H)^{-1}\Lambda^{-1}(D)^{-1}] = N_s\left[\frac{D}{N_s}\Lambda^{-1}\frac{D^H}{N_s}\right] \quad \text{Equation 30}$$

The MMSE solution is per Equation 31.

$$\underline{d} = R_c^{-1}(A^H\underline{r}) \quad \text{Equation 31}$$

The detected data vector $\underline{d}$ is of size $(N_s K)$ by 1.

The MMSE solution is per Equation 32.

$$D^H \underline{d} = \Lambda^{-1}[D^H(A^H\underline{r})] \quad \text{Equation 32}$$

The matrix $\Lambda$ is of size $(KN_s)$ by $(KN_s)$ with K by K blocks, and its inverse is per Equation 33.

$$\Lambda^{-1} = \begin{bmatrix} \Lambda^{(1)} & & & & \\ & \Lambda^{(2)} & & & \\ & & \Lambda^{(3)} & & \\ & & & \ddots & \\ & & & & \Lambda^{(N_s)} \end{bmatrix}^{-1} = \begin{bmatrix} [\Lambda^{(1)}]^{-1} & & & & \\ & [\Lambda^{(2)}]^{-1} & & & \\ & & [\Lambda^{(3)}]^{-1} & & \\ & & & \ddots & \\ & & & & [\Lambda^{(N_s)}]^{-1} \end{bmatrix} \quad \text{Equation 33}$$

The inversion requires an inversion of the K by K matrices $\Lambda^{(k)}$.

As a result, the data vector $\underline{d}$ is determined per Equation 34.

$$[F(\underline{d})]_k = [\Lambda^{(k)}]^{-1}[F(A^H\underline{r})]_k \quad \text{Equation 34}$$

Equation 34 is applicable to both receivers which sample the received signal at the chip rate and at a multiple of the chip rate, such as twice the chip rate. For multiple chip rate receivers, the R matrix corresponding to the multiple chip rate is of the same form as Equation 9, being approximately block circulant.

To reduce the complexity in determining $F(A^H\underline{r})$, an FFT approach taking advantage of the structure of A may be used. A has an approximately block-circulant structure. However, it is a non-square matrix, being of size $(N_s SF)$ by $(N_s K)$. An illustration of a matrix A is per Equation 35.

$$A = \begin{bmatrix} \begin{bmatrix} b_1^{(1)}(0) & b_1^{(K)}(0) \\ b_{SF}^{(1)}(0) & b_{SF}^{(K)}(0) \end{bmatrix} & 0 & 0 & \cdots \\ \begin{bmatrix} b_1^{(1)}(1) & b_1^{(K)}(1) \\ b_{SF}^{(1)}(1) & b_{SF}^{(K)}(1) \end{bmatrix} & \begin{bmatrix} b_1^{(1)}(0) & b_1^{(K)}(0) \\ b_{SF}^{(1)}(0) & b_{SF}^{(K)}(0) \end{bmatrix} & 0 & \cdots \\ \begin{bmatrix} b_1^{(1)}(2) & b_1^{(K)}(2) \\ b_{SF}^{(1)}(2) & b_{SF}^{(K)}(2) \end{bmatrix} & \begin{bmatrix} b_1^{(1)}(1) & b_1^{(K)}(1) \\ b_{SF}^{(1)}(1) & b_{SF}^{(K)}(1) \end{bmatrix} & \begin{bmatrix} b_1^{(1)}(0) & b_1^{(K)}(0) \\ b_{SF}^{(1)}(0) & b_{SF}^{(K)}(0) \end{bmatrix} & \cdots \\ \vdots & \vdots & \vdots & \vdots \end{bmatrix} \quad \text{Equation 35}$$

Each $b_j^{(k)}(i)$ is the convolution of the channel response $h^{(k)}$ and the spreading code $c^{(k)}$, for the $k^{th}$ user at the $j^{th}$ chip interval of the $i^{th}$ symbol interval.

Using blocks $B(\cdot)$, where each block is indicated by bracketing in Equation 35, Equation 35 becomes Equation 36.

$$A = \begin{bmatrix} B(0) & 0 & 0 & 0 & \cdots & 0 \\ B(1) & B(0) & 0 & 0 & \cdots & 0 \\ B(2) & B(1) & B(0) & 0 & \cdots & 0 \\ \vdots & \vdots & \vdots & \vdots & \vdots & \vdots \\ 0 & 0 & \cdots & B(2) & B(1) & B(0) \\ \vdots & \vdots & & \vdots & \vdots & \vdots \end{bmatrix} \quad \text{Equation 36}$$

As shown, a portion of A is block-circulant. A circulant extension of A is denoted as $A_c$.

A can be broken into three matrices per Equation 37.

$$A = D_1 \Lambda_1 D_2^H \quad \text{Equation 37}$$

$D_1$ is a $(N_s SF)$ by $(N_s SF)$ matrix. $D_2$ is a $(N_s K)$ by $(N_s K)$ matrix and $\Lambda_1$ is a block-diagon matrix of size $(N_s SF)$ by $(N_s K)$.

The block diagonal matrix $\Lambda_1$ has the same form as $\Lambda$ of Equation 14. However, each of its entries $\Lambda_1^{(i)}$ is a SF by K block per Equation 38.

$$\Lambda_1^{(i)} = \begin{bmatrix} \lambda_{1,1}^{(i)} & \cdots & \lambda_{1,K}^{(i)} \\ \vdots & & \vdots \\ \lambda_{SF,1}^{(i)} & \cdots & \lambda_{SF,K}^{(i)} \end{bmatrix}. \quad \text{Equation 38}$$

$D_2$ is the same form as that of D in Equation 11. $D_1$ is of the form of Equation 39.

$$D_1 = \begin{bmatrix} I & e^{\frac{j2\pi}{N_s}}I_{SF} & e^{\frac{j4\pi}{N_s}}I_{SF} & \cdots & e^{\frac{j18\pi}{N_s}}I_{SF} \\ I & e^{\frac{j4\pi}{N_s}}I_{SF} & e^{\frac{j8\pi}{N_s}}I_{SF} & \cdots & e^{\frac{j36\pi}{N_s}}I_{SF} \\ \vdots & \vdots & \vdots & & \vdots \\ I & e^{\frac{j18\pi}{N_s}}I_{SF} & e^{\frac{j36\pi}{N_s}}I_{SF} & \cdots & e^{\frac{j162\pi}{N_s}}I_{SF} \\ I & e^{\frac{j20\pi}{N_s}}I_{SF} & e^{\frac{j40\pi}{N_s}}I_{SF} & \cdots & e^{\frac{j180\pi}{N_s}}I_{SF} \end{bmatrix} \quad \text{Equation 39}$$

$I_{SF}$ is a SF by SF identity matrix.

In multiplying $A_C$ and $D_2$, products of the form, B(i) and $$e^{\frac{j2\pi}{N_s}}I_K,$$

are formed per Equation 40.

$$A_c D_2 = \begin{bmatrix} [B(0)+B(1)+B(2)] & \left[B(0)e^{\frac{j2\pi}{N_s}}+B(2)e^{\frac{j18\pi}{N_s}}+B(1)e^{\frac{j20\pi}{N_s}}\right] & \cdots & \left[B(0)e^{\frac{j18\pi}{N_s}}+B(2)e^{\frac{j162\pi}{N_s}}+B(1)e^{\frac{j180\pi}{N_s}}\right] \\ [B(0)+B(1)+B(2)] & \left[B(1)e^{\frac{j2\pi}{N_s}}+B(0)e^{\frac{j4\pi}{N_s}}+B(2)e^{\frac{j20\pi}{N_s}}\right] & \cdots & \left[B(1)e^{\frac{j18\pi}{N_s}}+B(0)e^{\frac{j36\pi}{N_s}}+B(2)e^{\frac{j180\pi}{N_s}}\right] \\ \vdots & \vdots & & \vdots \\ [B(0)+B(1)+B(2)] & \left[B(2)e^{\frac{j16\pi}{N_s}}+B(1)e^{\frac{j18\pi}{N_s}}+B(0)e^{\frac{j20\pi}{N_s}}\right] & \cdots & \left[B(2)e^{\frac{j144\pi}{N_s}}+B(1)e^{\frac{j162\pi}{N_s}}+B(0)e^{\frac{j180\pi}{N_s}}\right] \\ \vdots & \vdots & & \vdots \end{bmatrix} \quad \text{Equation 40}$$

$A_c D_2$ is of size ($N_s$SF) by ($N_s$K) and each block is a size SF by K.

In multiplying $D_1$ and $\Lambda_1$, products of the form, $$e^{\frac{j2\pi}{N_s}}I_{SF} \text{ and } \Lambda_1^{(i)},$$

are formed.

$D_1\Lambda_1$ is of size ($N_s$SF) by ($N_s$K) and each block is of size SF by K. Comparing any row of $A_c D_2$ with the same row of $D_1\Lambda_1$, Equation 41 results.

$$\Lambda_1^{(1)} = [B(0)+B(1)+B(2)], \quad \text{Equation 41}$$

$$\Lambda_1^{(2)} = \left[B(0)+B(1)e^{\frac{-j2\pi}{N_s}}+B(2)e^{\frac{-j4\pi}{N_s}}\right],$$

$$\vdots$$

$$\Lambda_1^{(N_s-1)} = \left[B(0)+B(1)e^{\frac{-j2(N_s-2)\pi}{N_s}}+B(2)e^{\frac{-j4(N_s-2)\pi}{N_s}}\right],$$

$$\Lambda_1^{(N_s)} = \left[B(0)+B(1)e^{\frac{-j2(N_s-1)\pi}{N_s}}+B(2)e^{\frac{-j4(N_s-1)\pi}{N_s}}\right].$$

As a result, each $\Lambda_1^{(k)}$ can be determined using the FFT of a one-sided sequence of (SF by K) blocks. Using Equation 38 and $D_2^H D_2 = N_s I_{KN_s}$, Equations 42, 43 and 44 result.

$$A = D_1 \Lambda_1 D_2^H, \quad \text{Equation 42}$$

$$A^H \underline{r} = D_2 \Lambda_1^H (D_1^H \underline{r}) \quad \text{Equation 43}$$

$$D_2^H(A^H \underline{r}) = N_s \cdot [\Lambda_1^H(D_1^H \underline{r})] \quad \text{Equation 44}$$

Accordingly, $[F(A^H \underline{r})]_k$ is determined using FFTs per Equation 45.

$$[F(A^H \underline{r})]_k = N_s \cdot [\Lambda_1^{(k)}]^H [F(\underline{r})]_k \quad \text{Equation 46}$$

Similarly, since the matrix A is approximately block-circulant, $R = A^H A + \sigma^2 I$ can also be computed using FFTs using $\Lambda_1$.

To reduce complexity, the inversion of each $\Lambda^{(i)}$, $[\Lambda^{(i)}]^{-1}$, can be performed using LU decomposition. Each $[\Lambda^i]$ is a (K by K) matrix whose LU decomposition is per Equation 46.

$$\Lambda^{(i)} = LU \quad \text{Equation 46}$$

L is a lower triangular matrix and U is an upper triangular matrix. Equation 7 is solved using forward and backward substitution per Equations 47 and 48.

$$[\Lambda_g^{(k)}]y = [F(A^H \underline{r})]_k \quad \text{Equation 47}$$

$$y = [\Lambda_g^{(k)}]^H [F(\underline{d})]_k \quad \text{Equation 48}$$

Figure 5:
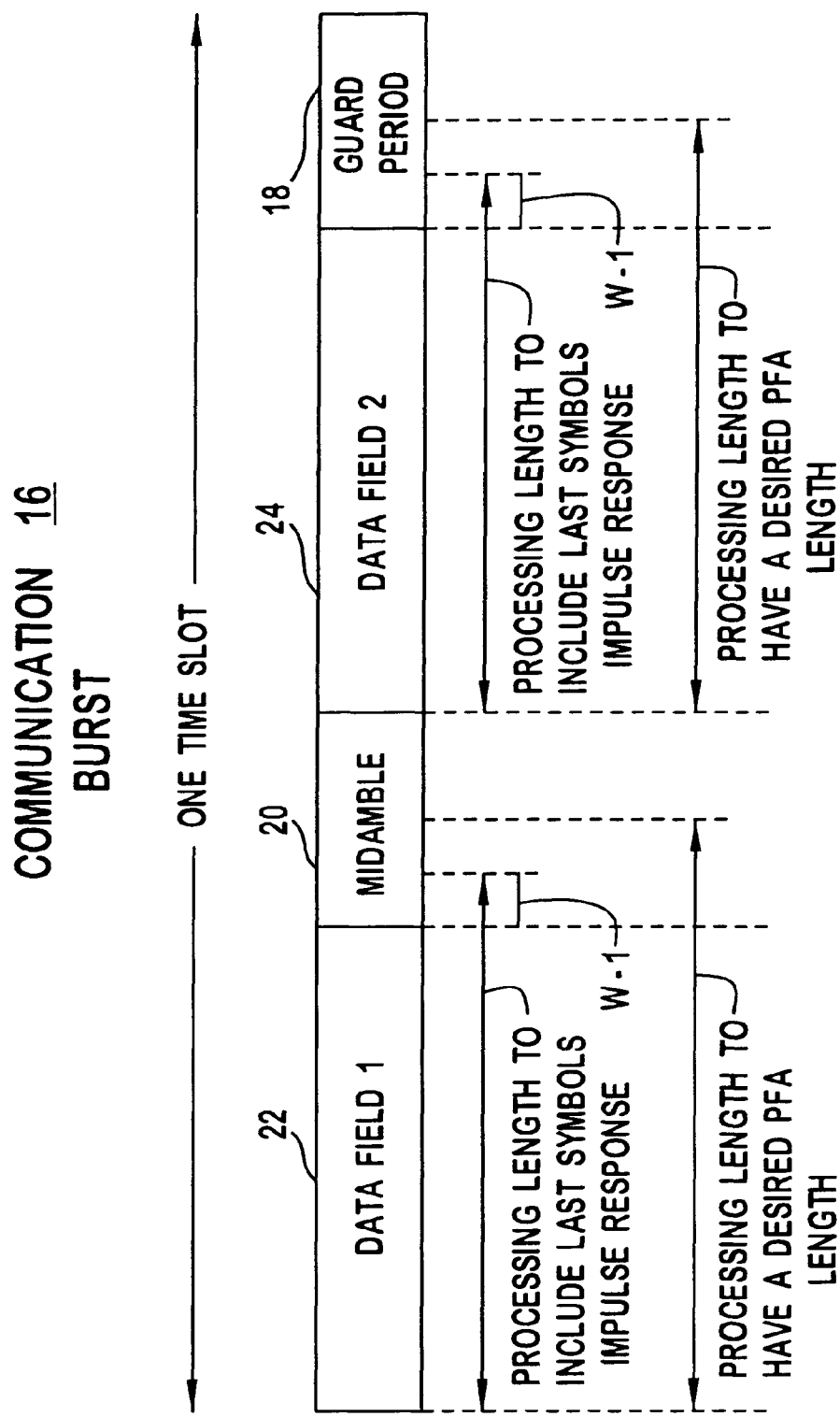
FIG. 5 is an illustration of a data burst indicating extended processing areas.

Preferably, to improve the bit error rate (BER) for data symbols at the ends of each data fields 22, 24, samples from the midamble portion 20 and guard period 18 are used in the data detection as shown in FIG. 5. To collect all the samples of the last symbols in the data fields, the samples used to determine $\underline{r}$ are extended by W−1 chips (the length of the impulse response) into the midamble 20 or guard period 18. This extension allows for substantially all the multipath components of the last data symbols of the field to be used for data detection. As shown for data field 1 22, the samples are extended into the midamble by W−1 chips. The midamble sequences are cancelled from the samples taken from the midamble 20 prior to data detection processing. For data field 2 24, the samples are extended into the guard period 18 by W−1 chips.

Certain FFT implementations required a certain field length for analysis. One of these FFT implementations is a prime factor algorithm (PFA). The PFA implementation requires the field length to be a prime number, such as 61. To facilitate PFA FFT implementation, the samples used to determine $\underline{r}$ are preferably extended to a desired PFA length. As shown in FIG. 5, data field 1 or data field 2 are extended by P chips to the desired PFA length. Alternately, block FFTs of 61 symbols are extended to block FFTs of length 64, which requires $2^n$ FFT calculations. Since the approximation of R to a block circulant matrix is reduced, the performance typically improves.

An analysis of the computational complexity of fast joint detection is as follows. The computational complexity of calculating A is K·SF·W. The computational complexity of calculating $A^H A$ is per Equation 49.

$$\frac{(K^2+K)}{2}[2(SF+W-1)-(n_{max}-1)]\frac{n_{max}}{2}- \quad \text{Equation 49}$$

$$\frac{(K^2-K)}{2}(SF+W-1)$$

where $n_{max} = \min(N_s, (SF+W-1)/SF)+1)$

Calculating $(A^H \underline{r})$ A as a matrix-vector multiplication has a computational complexity of K $N_s$(SF+W−1). Calculating the FFT of a $j^{th}$ column-block of R requires $K^2 \cdot (N_s \log_2 N_s)$ calculations. Calculating the Fourier transform of $A^H \underline{r}$ requires $K(N_s \log 2 N_s)$ calculations. The inversion of each matrix $[\Lambda^{(k)}]$, without Cholesky decomposition, requires $K^3$ calculations. For $N_s$ frequency points, the total number of calculations is $N_s K^3$. Calculating $[F(\underline{d})]_k = [\Lambda^{(k)}]^{-1}[F(A^H \underline{r})]_k$ requires $(K^2)$ multiplications for $N_s$ frequency points. Accordingly, the total number of calculations is $N_s K^2$. The Inverse FFT of $[F(\underline{d})]$ requires $K(N_s \log 2\, N_s)$ calculations.

To illustrate the complexity for fast joint detection, the million real operations per second (MROPs) for processing a TDD Burst Type I with $N_c=976$, SF=16, K=8, $N_s=61$ and W=57 chips is determined. The calculations A, $(A^H A)$, a column-block of R, $[\Lambda^{(k)}]^{31\ 1}$ are performed once per burst, i.e. 100 times per second. The calculations $A^H \underline{r}$, F $[A^H \underline{r}]$, computing $[F(\underline{d})]_k$ and the inverse FFT of $[F(\underline{d})]$ are performed twice per burst, i.e. 200 times per second. Four calculations are required to convert a complex operation into a real operation. The results are illustrated in Table 1.

TABLE 1

|  | MROPS |
|---|---|
| Functions executed once per burst |  |
| Calculating A | 3.0 |
| Calculating $A^H A$ | 4.4 |
| Calculating $F([R]_j)$ | 9.2614 |
| Calculating $[\Lambda^{(k)}]^{-1}$ | 12.4928 |
| Functions executed twice per burst |  |
| Calculating $A^H r$ | 28.11 |
| Calculating F $[A^H r]$ | 2.3154 |
| Calculating $[F(d^\wedge)]_k = [\Lambda^{(k)}]^{-1}[F(A^H r)]_k$ | 3.1232 |
| Inverse FFT of $[F(d^\wedge)]$ | 2.3154 |
| Total number of MROPS required for fast joint detection | 65.0182 |

Note: in Table 1, $(A^H \underline{r})$ was calculated directly as a matrix-vector multiplication.

If LU decomposition is used to determine $[\Lambda^{(k)}]^{-1}$, the complexity reduces to 54.8678 MROPS. If FFTs are used to determine $(A^H \underline{r})$, the complexity reduces from 65.0182 MROPS to 63.9928 MROPS.

A comparison of the complexity of fast joint detection and other detection techniques is as follows. The complexity of the following three techniques for a TDD Burst Type I with SF=16 and K=8 is per Table 2.

TABLE 2

| Technique | MROPS |
|---|---|
| Approximate Cholesky based Joint Detection, (JDChol) | 82.7 |
| Single User Detection: Approximate Cholesky based Equalization followed by a Hadamard Transform based Despreading (SDChol) | 205.2276 |
| Fast Joint Detection (JDFFT) | 65.0182 |

The performance of the three detection techniques and a reference matched filtering (MF) data detection technique were compared by simulation over 800 timeslots. The simulations used the precision provided by Matlab, i.e. no finite precision effects were considered. The simulations used channels specified by WCDMA TDD WG4; SF=16 and K=8 and 12 and were performed for the downlink with no transmit diversity to facilitate comparison to SUD.

Figure 6:
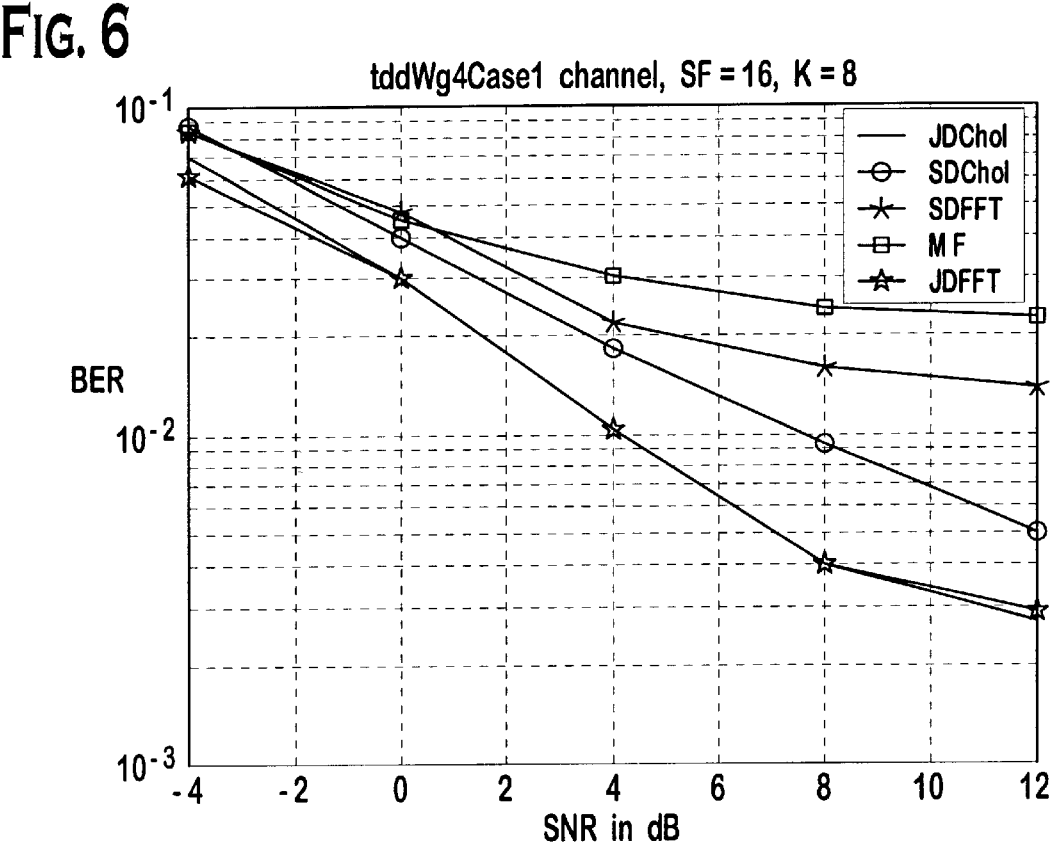
FIGS. 6–11 are graphs illustrating the simulated performance of fast joint detection to other data detection approaches.
Figure 7:
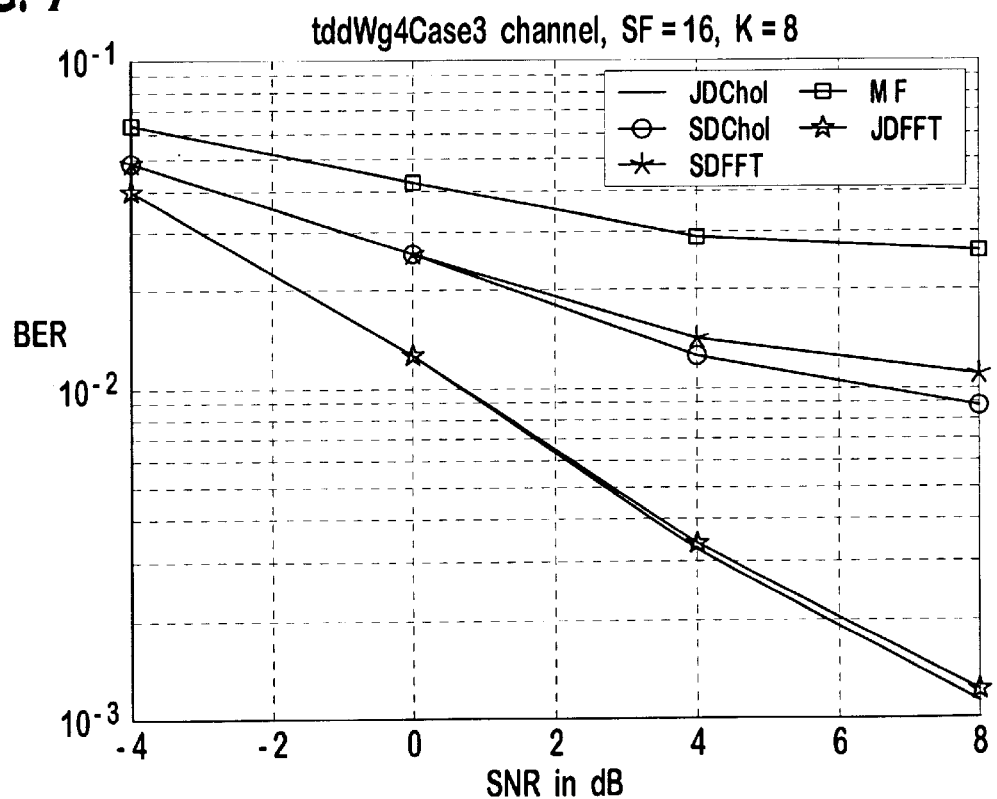
Figure 8:
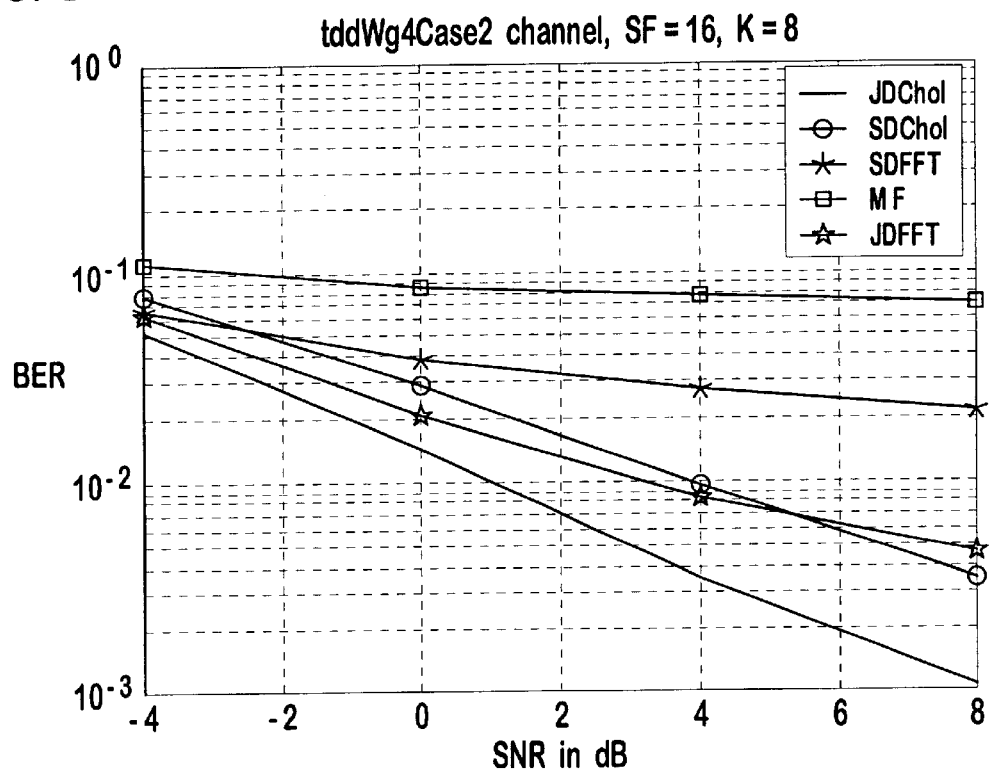
Figure 9:
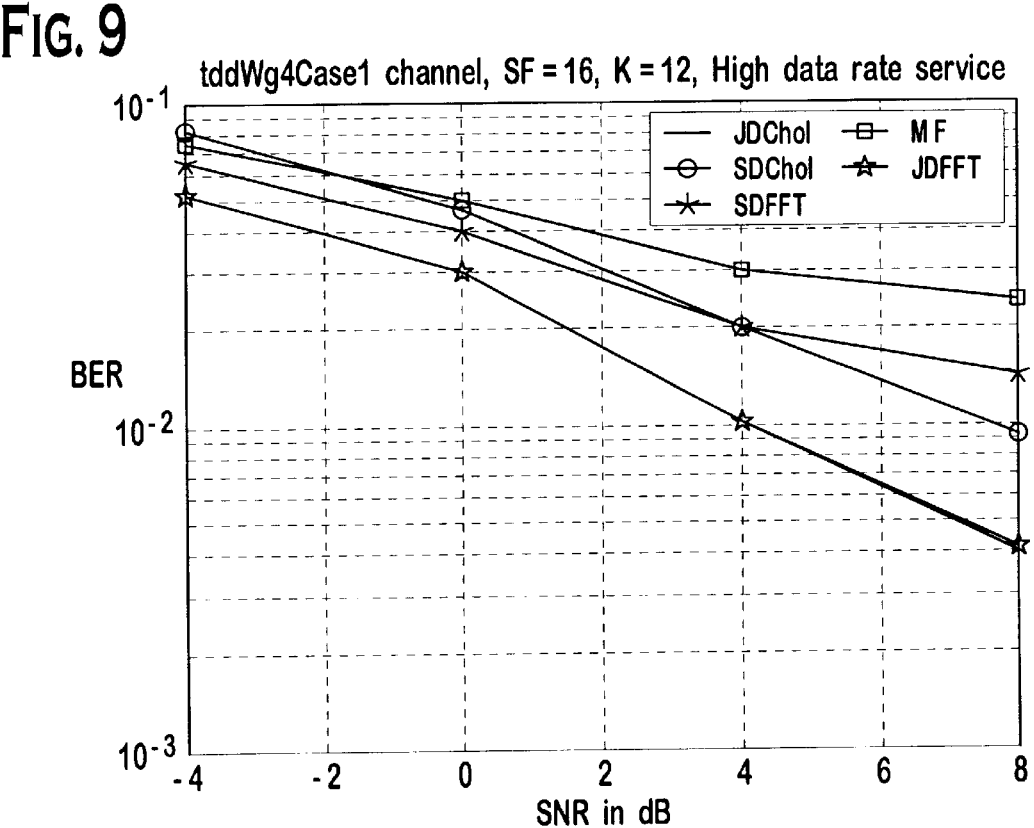
Figure 10:
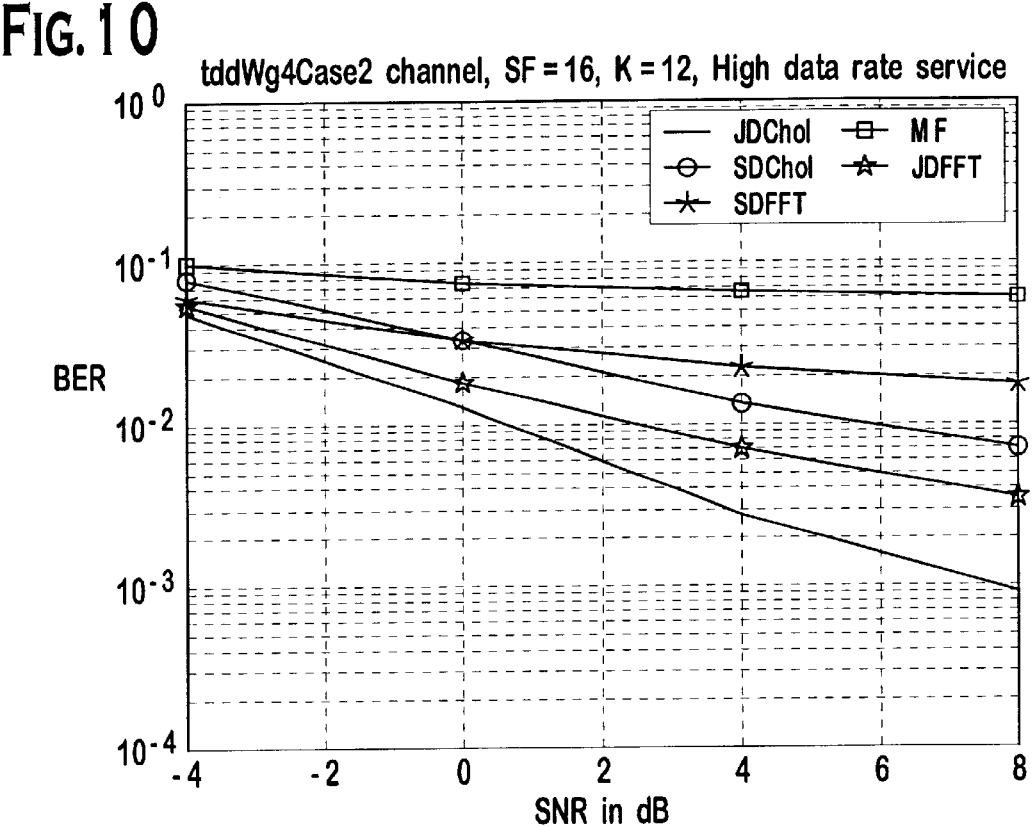
Figure 11:
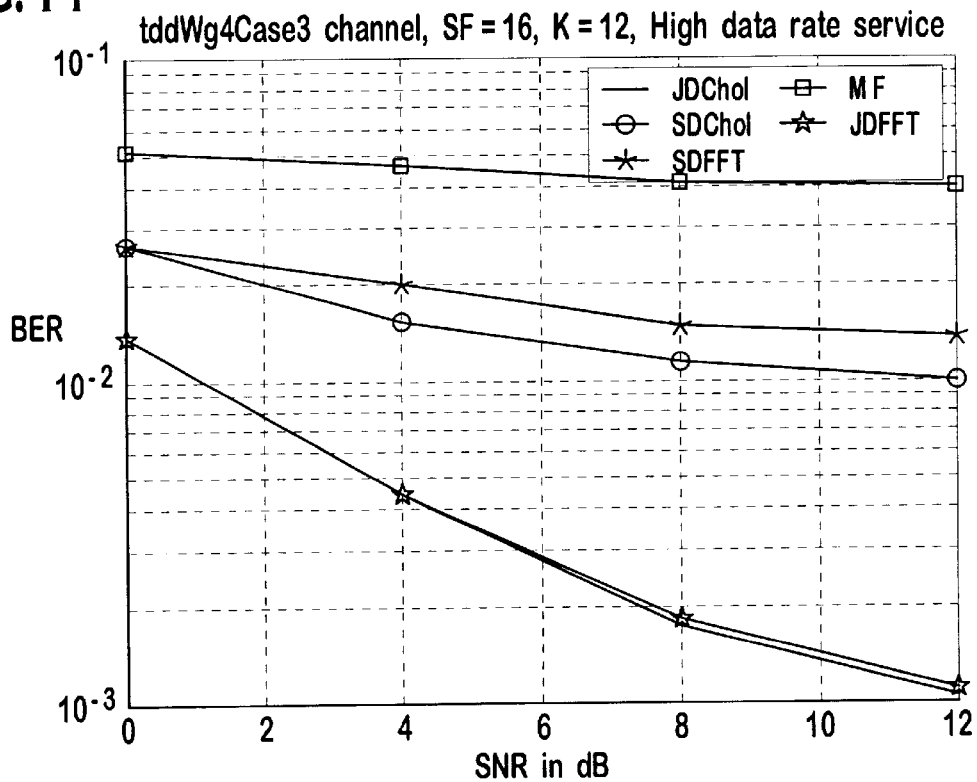

As shown in FIGS. 6 and 7, respectively, for cases 1 and 3, the performance of fast joint detection, JDFFT, is very close to that of the Cholesky based Joint Detection, JDChol. The other data detection approaches did not perform as well as JDChol or JDFFT. For the tddWg4Case2 channel as shown in FIG. 8. JDFFT shows some degradation compared to JDChol. It also performs similarly to the SUD based Cholesky algorithm, SDChol. For a high data rate service, such as a 2 Mbps service, as shown in FIGS. 9–11. JDFFT performs close to or slightly worse than JDChol and better than the other approaches.

What is claimed is:

1. A code division multiple access base station, the base station receives K data signals over a shared spectrum, the base station comprising:

means for receiving and sampling a combined signal having the K transmitted data signals over the shared spectrum;

means for producing a combined channel response matrix using codes and impulse responses of the K data signals;

means for determining a block column of a cross correlation matrix using the combined channel response matrix, each block entry of the block column being a K by K matrix;

means for taking a fourier transform of a complex conjugate transpose of the combined channel response matrix multiplied to the combined signal samples;

means for multiplying an inverse of a fourier transform of each block entry to a result of the fourier transform to produce a fourier transform of the data vector; and means for taking an inverse fourier transform of the data vector fourier transform to produce data of the K data signals.

2. The base station of claim 1 wherein the taking the fourier transform is by multiplying the conjugate transpose of the combined channel response matrix to the combined signal samples and taking fourier transform of a result of the conjugate transpose multiplication.

3. The base station of claim 1 wherein a Cholesky decomposition of the block entries of the diagonal matrix is used to determine the data.

4. The base station of claim 1 wherein the data determining occurs over a data field time period of a time division duplex communication burst and the combined signal samples extend beyond the data field time period.

5. The base station of claim 4 wherein extended samples of the combined signal samples extends beyond the data field time period for a length of the impulse response.

6. The base station of claim 4 wherein the combined signal samples extends beyond the data field time period so that a length of the combined signals is a length compatible with a prime factor algorithm fast fourier transform.

7. A code division multiple access base station, the base station receives K data signals over a shared spectrum, the base station comprising:

an antenna for receiving a combined signal having the K transmitted data signals over the shared spectrum;

a sampling device for sampling the combined signal;

a channel estimator for estimating impulse responses of the K data signals; and a data detection device for producing a combined channel response matrix using codes and the impulse responses of the K data signals; for determining a block column of a cross correlation matrix using the combined channel response matrix, each block entry of the block column being a K by K matrix; for taking a fourier transform of a complex conjugate transpose of the combined channel response matrix multiplied to the combined signal samples; multiplying an inverse of a fourier transform of each block entry to a result of the fourier transform to produce a fourier transform of a data vector; and for taking an inverse fourier transform of the data vector fourier transform to produce data of the K data signals.

8. The base station of claim 7 wherein the taking the fourier transform is by multiplying the conjugate transpose of the combined channel response matrix to the combined signal samples and taking fourier transform of a result of the conjugate transpose multiplication.

9. The base station of claim 7 wherein a Cholesky decomposition of the block entries of the diagonal matrix is used to determine the data.

10. The base station of claim 7 wherein the data determining occurs over a data field time period of a time division duplex communication burst and the combined signal samples extend beyond the data field time period.

11. The base station of claim 10 wherein extended samples of the combined signal samples extends beyond the data field time period for a length of the impulse response.

12. The base station of claim 10 wherein the combined signal samples extends beyond the data field time period so that a length of the combined signals is a length compatible with a prime factor algorithm fast fourier transform.

* * * * *

UNITED STATES PATENT AND TRADEMARK OFFICE
CERTIFICATE OF CORRECTION

PATENT NO. : 6,608,859 B2  
DATED : August 19, 2003  
INVENTOR(S) : De et al.

It is certified that error appears in the above-identified patent and that said Letters Patent is hereby corrected as shown below:

Column 4,  
Line 1, delete "$\underline{r}$from", and insert therefor -- $\underline{r}$ from --.  
Line 19, delete "$(\cdot)^{H}$", and insert therefor -- $(\cdot)^{H}$ --.

Line 21, Equation 6, delete "$\underline{R}=A^{H}A+\sigma^{2}I$", and insert therefore -- $R = A^{H}A + \sigma^{2}I$ --.

Line 48, delete "$f[A^{H}r]_{k}$", and insert therefor -- $F[A^{H}r]_{k}$ --.

Line 64, Equation 8, delete "$R\underline{d}=(A^{H}A+\sigma^{2}I)\underline{d}=A^{H}\underline{r}$", and insert therefor -- $R\underline{d} = (A^{H}A + \sigma^{2}I)\underline{d} = A^{H}\underline{r}$ --.

Column 6,  
Line 20, delete "$R_{c}=DAD^{H}$", and insert therefor -- $R_{c} = DAD^{H}$ --.  
Line 38, delete "$D^{H}D$", and insert therefor -- $D^{H}D$ --.

Equation 12, delete "$D^{H}D=N_{s}I_{KN_{s}}$", and insert therefor -- $D^{H}D = N_{s}I_{KN_{s}}$ --.

Column 7,  
Line 63, Equation 19, delete "$\Lambda^{(1)}=(R_{0}+R_{1}^{H}+R_{2}^{H}+R_{1}+R_{2})$", and insert therefor -- $\Lambda^{(1)} = (R_{0} + R_{1}^{H} + R_{2}^{H} + R_{1} + R_{2})$ --.

Column 8,  
Line 57, delete "$\{0, 0, \ldots, R_{2}, R_{1}, R_{0}, R_{1}^{H}, R_{2}^{H}, \ldots, 0, 0\}$", and insert therefor -- $\{0, 0, \cdots, R_{2}, R_{1}, R_{0}, R_{1}^{H}, R_{2}^{H}, \cdots, 0, 0\}$ --.

Column 9,  
Line 24, delete "$D^{H}D=N_{s}I_{KN_{s}}, D^{-1}=(1/N_{s})D^{H}$", and insert therefor -- $D^{H}D = N_{s}I_{KN_{s}}, D^{-1} = (1/N_{s})D^{H}$ --.

Line 31, Equation 31, delete "$\underline{d}=R_{c}^{-1}(A^{H}\underline{r})$", and insert therefor -- $\underline{d} = R_{c}^{-1}(A^{H}\underline{r})$ --.

Line 36, Equation 32, delete "$D^{H}\underline{d}= \Lambda^{-1}[D^{H}(A^{H}\underline{r})]$", and insert therefor -- $D^{H}\underline{d} = \Lambda^{-1}[D^{H}(A^{H}\underline{r})]$ --.

UNITED STATES PATENT AND TRADEMARK OFFICE
CERTIFICATE OF CORRECTION

PATENT NO. : 6,608,859 B2
DATED : August 19, 2003
INVENTOR(S) : De et al.

It is certified that error appears in the above-identified patent and that said Letters Patent is hereby corrected as shown below:

Column 11,
Line 57, delete "$D_2{}^H D_2 = N_s I_{KN_s}$", and insert therefor -- $D_2{}^H \overline{D_2} = N_s I_{KN_s}$ --.
Line 61, delete "$[F(A^{ll}\underline{r})]k$", and insert therefor -- $[F(A^H \underline{r})]_k$ --.
Line 66, delete "$R = A^{ll}A + \sigma^2 I$", and insert therefor -- $R = A^H A + \sigma^2 I$ --.

Column 12,
Line 65, delete "$(A^{ll}\underline{r})$", and insert therefor -- $(A^H \underline{r})$ --.

Column 13,
Line 1, delete "$A^{ll}\underline{r}$", and insert therefor -- $A^H \underline{r}$ --.
Line 5, delete "$[F(\underline{d})]_k = [\Lambda^{(k)}]^{-1} [F(A^{ll}\underline{r})]_k$", and insert therefor -- $[F(\underline{d})]_k = [\Lambda^{(k)}]^{-1}[F(A^H \underline{r})]_k$ --.
Line 12, delete "$(A^{ll}A)$", and insert therefor -- $(A^H A)$ --.
Line 13, delete "$[\Lambda^{(k)}]^{31\ 1}$", and insert therefor -- $[\Lambda^{(k)}]^{-1}$ --.
Line 25, Table 1, delete "Calculating $A^{ll}A$", and insert therefor -- Calculating $A^H A$ --.
Line 31, Table 1, delete "Calculating $[F(d^\wedge)]_k = [\Lambda^{(k)}]^{-1}[F(A^{ll}r)]_k$", and insert therefor -- Calculating $[F(\mathbf{d}^\wedge)]_k = [\Lambda^{(k)}]^{-1}[F(A^H \mathbf{r})]_k$ --.

This certificate supersedes Certificate of Correction issued January 20, 2004.

Signed and Sealed this

First Day of June, 2004

JON W. DUDAS
*Acting Director of the United States Patent and Trademark Office*